US008314959B2

(12) United States Patent
Gross

(10) Patent No.: US 8,314,959 B2
(45) Date of Patent: Nov. 20, 2012

(54) ADAPTIVE CYCLE UP CONVERGENCE CRITERIA

(75) Inventor: Eric M. Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1151 days.

(21) Appl. No.: 11/773,135

(22) Filed: Jul. 3, 2007

(65) Prior Publication Data

US 2009/0009776 A1 Jan. 8, 2009

(51) Int. Cl.
*G06F 3/12* (2006.01)

(52) U.S. Cl. .......... 358/1.15; 358/1.9; 358/504; 347/19; 702/191; 702/195

(58) Field of Classification Search .................. 718/104; 358/3.05, 1.9, 504, 1.13, 3.06; 399/9, 46, 399/49; 347/19; 702/191, 195
See application file for complete search history.

(56) References Cited

U.S. PATENT DOCUMENTS

| | | | | |
|---|---|---|---|---|
| 5,142,675 | A * | 8/1992 | Oi et al. | 718/104 |
| 5,809,177 | A * | 9/1998 | Metcalfe et al. | 358/3.05 |
| 6,441,915 | B1 * | 8/2002 | Imaizumi et al. | 358/1.15 |
| 6,625,331 | B1 * | 9/2003 | Imaizumi et al. | 382/294 |
| 6,694,109 | B1 * | 2/2004 | Donaldson et al. | 399/49 |
| 6,697,582 | B1 * | 2/2004 | Scheuer | 399/49 |
| 6,741,816 | B2 * | 5/2004 | Shim et al. | 399/49 |
| 6,753,987 | B1 * | 6/2004 | Farnung et al. | 358/518 |
| 6,873,441 | B1 * | 3/2005 | Kuwabara et al. | 358/521 |
| 7,123,850 | B1 * | 10/2006 | Hamby et al. | 399/46 |
| 7,206,099 | B2 * | 4/2007 | Brewington et al. | 358/3.06 |
| 2001/0015816 | A1 * | 8/2001 | Metcalfe | 358/1.9 |
| 2003/0020974 | A1 * | 1/2003 | Matsushima | 358/521 |
| 2004/0012817 | A1 * | 1/2004 | Brewington et al. | 358/3.06 |
| 2004/0047666 | A1 * | 3/2004 | Imaizumi et al. | 400/76 |
| 2005/0099446 | A1 * | 5/2005 | Mizes et al. | 347/19 |
| 2006/0077488 | A1 * | 4/2006 | Zhang et al. | 358/504 |
| 2006/0087706 | A1 * | 4/2006 | Shim et al. | 358/504 |
| 2006/0181562 | A1 * | 8/2006 | Hirano et al. | 347/15 |
| 2007/0003292 | A1 * | 1/2007 | Lestrange | 399/9 |
| 2008/0144067 | A1 * | 6/2008 | Burry et al. | 358/1.13 |
| 2008/0240788 | A1 * | 10/2008 | Mashtare et al. | 399/223 |

* cited by examiner

*Primary Examiner* — Twyler Haskins
*Assistant Examiner* — Nicholas Pachol
(74) *Attorney, Agent, or Firm* — Oliff & Berridge, PLC

(57) ABSTRACT

A method of adjusting cycle-up criteria of a device based on estimated noise levels, including obtaining a current estimated noise level, adjusting the cycle-up criteria according to the estimated noise level, comparing at least one signal, from which the noise level is estimated, with at least one target value, calculating the difference between the signal and the at least one target value, calculating the calculated difference between the signal and the at least one target value with the adjusted cycle-up criteria; and initiating a print job if the calculated difference falls within the adjusted cycle-up criteria.

20 Claims, 3 Drawing Sheets

ADAPTIVE CYCLE UP CONVERGENCE CRITERIA

BACKGROUND

The present disclosure relates to methods and systems of monitoring and regulating a xerographic marking device by use of performance monitoring to adjust tone reproduction curve (TRC) cycle-up criteria.

TRC cycle-up criteria is an extremely important set point in the determination of a xerographic marking device's performance in terms of cycle-up convergence (CUC) time and image quality regulation. System properties can drift over time in a print engine, negatively impacting system performance and print quality stability. In order to maintain stable performance, a xerographic marking device uses process control schemes by employing optical density sensors, for example, an extended toner area coverage sensor (ETAC), as well as other types of sensors (color engines may have multiple toner control sensors and optical density sensors). Utilizing sensors to measure the state of development allows for a determination on whether or not the TRC mean is within desired TRC cycle-up criteria. If a sensor identifies that the TRC mean is within the TRC cycle-up criteria, the system will allow for printing of a print job to commence. However, if the sensor indicates that the TRC mean falls outside of the TRC cycle-up criteria, indicating that properties have shifted and therefore the quality of the print may be affected, printing will not commence until the system is brought within the criteria's specifications.

Noise level estimates can van, dramatically depending upon machine conditions. Therefore, due to the noise level estimates caused by a sensor and/or the system itself, a read from a sensor may not reflect the true state. For example, the sensor may indicate that the TRC mean falls outside the TRC cycle-up criteria when in fact the TRC mean is on target. Thus, TRC cycle-up criteria that are too tight relative to noise level estimates may unnecessarily delay the start of a print job. This is not only a customer annoyance, but it also has a direct impact on component and material life, that is, parts usage and degradation, while not productively printing. Similarly, TRC cycle-up criteria that are too loose relative to noise level estimates may prematurely initiate a print job prior to the point in time when the TRC is reasonably close to target. This not only impacts system performance, but print quality/stability as well.

Currently, TRC cycle-up criteria are static and therefore problematic. As mentioned above, TRC cycle-up criteria that are too tight or too loose relative to noise level estimates may have a negative effect on system performance, print quality/stability, improperly delaying a print job and/or prematurely initiating a print job. Such static cycle-up criteria with respect to noise levels hinder the critical task of print proofing, color calibration, and the like.

SUMMARY

What is desired are methods and systems that allow for the adjustment of TRC cycle-up criteria. Further, desired are methods and systems that utilize the knowledge of noise levels to make adjustments to the TRC cycle-up criteria.

In embodiments, described is a method of adjusting cycle-up criteria of a device based on estimated noise levels, including obtaining a current estimated noise level, adjusting the cycle-up criteria according to the estimated noise level, comparing at least one signal, from which the noise level is estimated, with at least one target value, calculating the difference between the signal and the at least one target value, comparing the calculated difference between the signal and the at least one target value with the adjusted cycle-up criteria; and initiating a print job if the calculated difference falls within the adjusted cycle-up criteria.

In further embodiments, described is a system for adjusting the tone reproduction curve (TRC) cycle-up criteria of a xerographic marking device, including a photoreceptor, an optical sensor, a user interface, and a controller, wherein the controller: compares current sensor reads with at least one target value, calculates the difference between the sensor read and the at least one target value, and compares the calculated difference to the cycle-up criteria that has been adjusted according to current estimated noise level.

In still further embodiments, described is a method of forming an image on a xerographic marking device, including a) obtaining a current estimated noise level, b) adjusting tone reproduction curve (TRC) cycle-up criteria according to a current estimated noise level, c) comparing the signal, from which the current noise level is estimated, with at least one target value, d) calculating the difference between the current signal and the at least one target value, e) comparing the calculated difference between the current estimated noise level and the at least one target value with the TRC cycle-up criteria, wherein if the calculated difference falls within the adjusted TRC cycle-up criteria, convergence is declared and printing is initiated, wherein if the calculated difference does not fall within the adjusted TRC cycle-up criteria, steps a)-e) are repeated.

The methods and systems herein thus have utility in lowering a user's wait time for CUC, lengthening component and material life, and improving the overall image quality and efficiency of a print job.

EMBODIMENTS

While the present disclosure concentrates on tone reproduction curve (TRC), one of ordinary skill in the art will appreciate that other types of convergence are well within the scope of the present disclosure.

Figure 1:
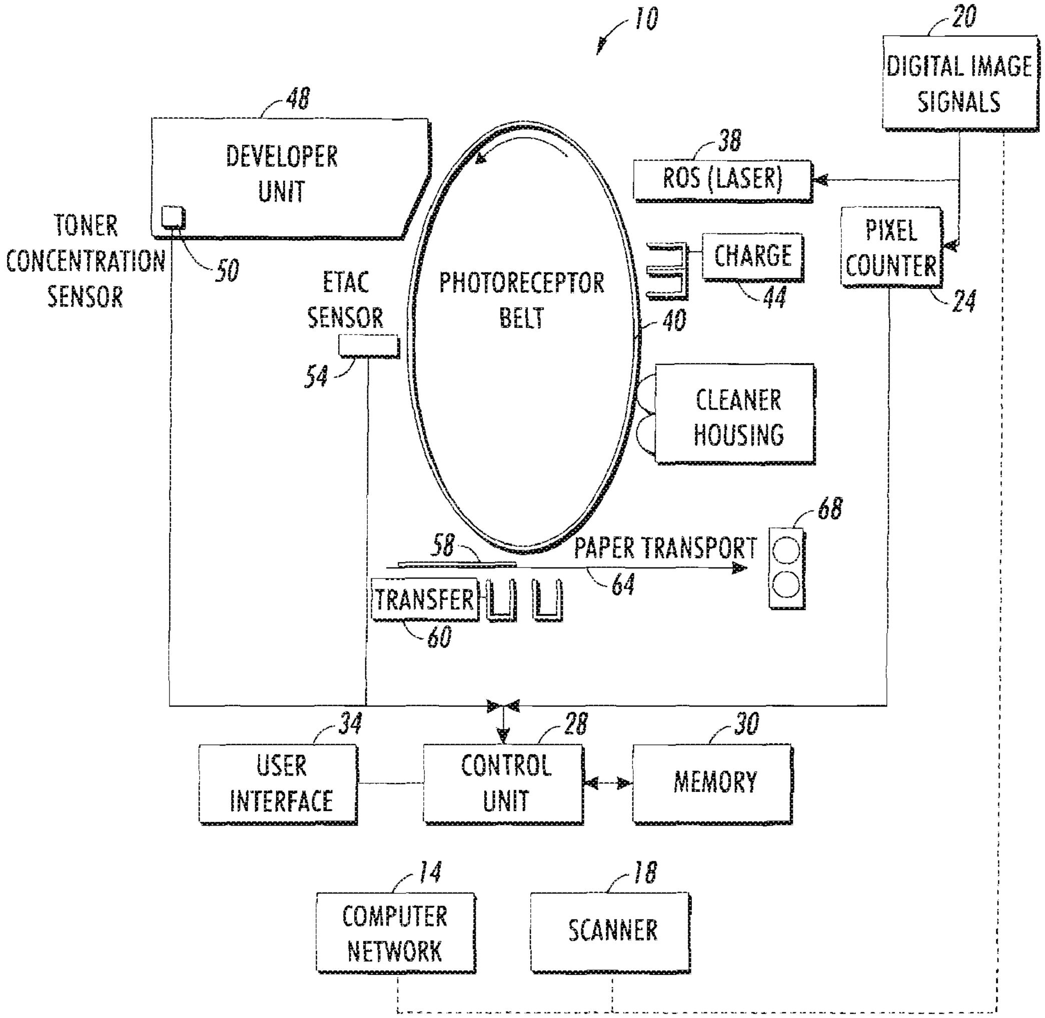
FIG. 1 shows a block diagram of a xerographic marking device in accordance with the present disclosure.

FIG. 1 shows a block diagram of a xerographic marking device in accordance with the present disclosure. The system 10 may include a computer network 14 through which digital documents are received from computers, scanners, and other digital document generators. Also, digital document generators, such as scanner 18, may be coupled to the digital image receiver 20. The data of the digital document images are provided to a pixel counter 24 that is also coupled to a controller 28 having a memory 30 and a user interface 34. The digital document image data is also used to drive the ROS 38. The photoreceptor belt 40 rotates in the direction shown in FIG. 1 for the development of the latent image and the transfer of toner from the latent image to the support material.

To generate a hard copy of a digital document, the photoreceptor belt is charged using corona discharger 44 and then exposed to the ROS 38 to form a latent image on the photoreceptor belt 40. Toner is applied to the latent image from developer unit 48. Signals from an optical sensor 54 may be used by the controller 28 to determine the developed mass per unit area (DMA) and halftone color levels for images being developed by the system 10. In embodiments, optical sensor 54 is an extended toner area coverage sensor (ETAC). The toner applied to the latent image is transferred to a sheet of support material 58 at transfer station 60 by electrically charging the backside of the sheet 58. The sheet is moved by paper transport 64 to fuser 68 so that the toner is permanently affixed to the sheet 58. In embodiments, during a print job and upon cycle-up, samples of noise level estimates related to, for example, toner concentrations, image on image (IOI) registration, and voltages among others, are continuously taken and stored in memory 30, creating an ongoing log. This allows the system to obtain current estimated noise levels when the print job is requested and before cycle-up completion when the print job begins rendering on a substrate.

Figure 2:
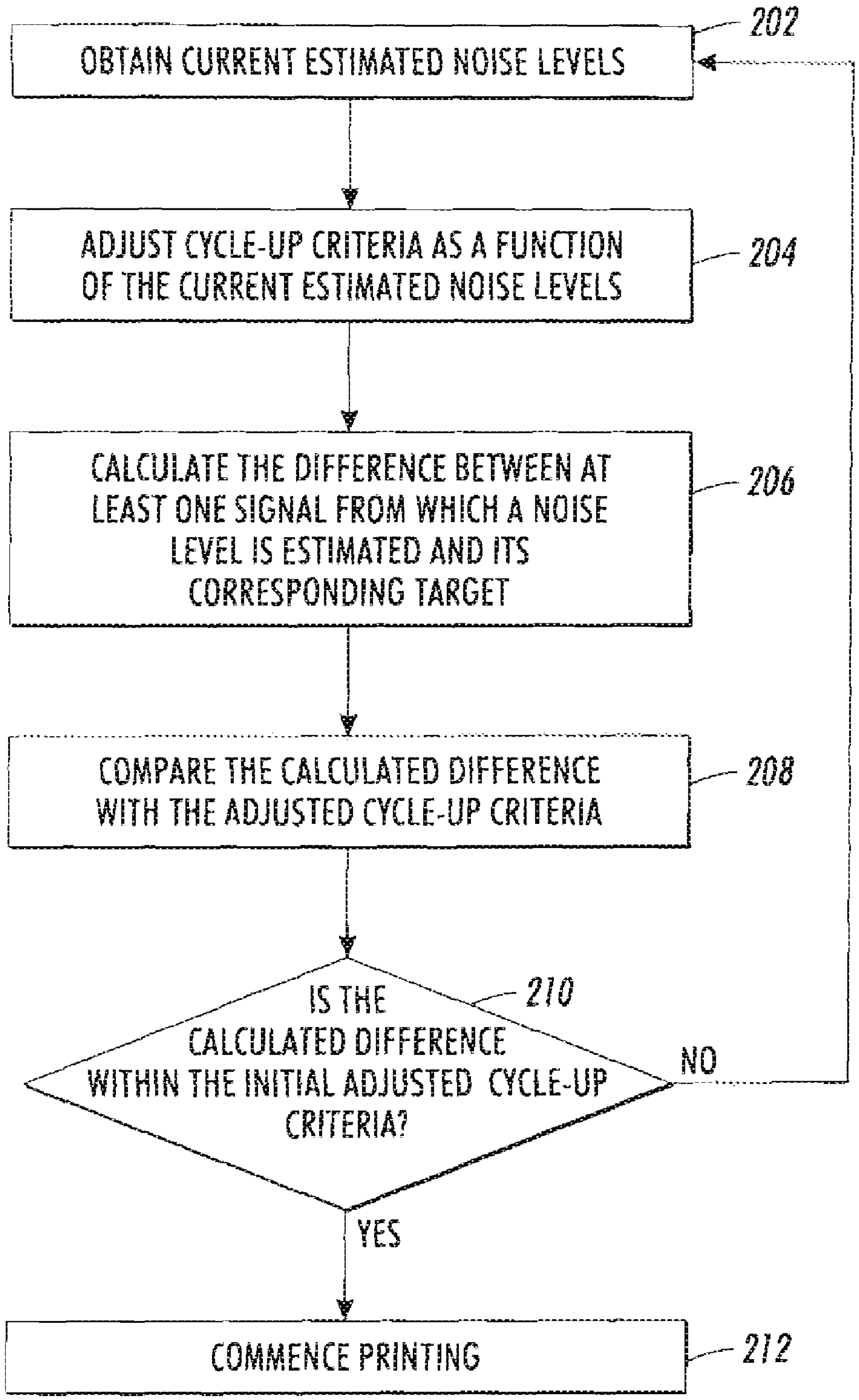
FIG. 2 is a flow chart of a method for adjusting tone reproduction curve cycle-up convergence criteria in accordance with the present disclosure.

A flow chart of a method for adjusting TRC cycle-up criteria in accordance with the present disclosure is shown in FIG. 2. After a user requests a print job, and before cycle-up, at step 202, current estimated noise levels of the system and/or of the one or more sensors are obtained. At step 204, controller 28 adjusts the cycle-up criteria as a function of the current estimated noise levels. One of ordinary skill in the art will appreciate that estimating noise level variance may be accomplished by a number of applicable robust techniques prevalent in literature. One common technique for estimating the standard deviation of noise level estimates that is robust against outliers and low frequency drift, and therefore applicable for measuring random noise atop non stationary drift, is represented by the following equation:

$$\sigma=(1/(n*1.128))\Sigma[Y_{i+1}-Y_i]$$

Here, n refers to the number of samples, Y represents the sample value of the variable, and σ is an estimate of standard deviation of the stationary component of Y. Here, it is assumed that Y is composed of a drift term (non stationary with no defined standard deviation) and a random term (stationary with standard deviation estimated by σ).

At step 206, controller 28 calculates the difference between at least one signal, from which a noise level is estimated, and the signal's corresponding target. At step 208, controller 28 compares the calculated difference with the cycle-up criteria, which was adjusted as a function of the estimated noise level. If it is within the criteria, printing commences. For example, assume the adjusted TRC cycle-up criteria is set at +/−1, and the calculated difference between the current signal from which the current noise level is estimated and the target is +2. The printer will not begin printing and will wait for further adjustments that are made to by the control system to converge to target. The TRC cycle-criteria of +/−1 will increase or decrease as the noise level estimate increases or decreases.

In embodiments, the initial TRC cycle-up criteria are default settings set during manufacturing. Therefore, upon a request to print and before cycle-up, the cycle-up criteria will automatically be adjusted based on the acquired noise level estimates. In further embodiments, the initial TRC cycle-up criteria are unique to each type of print job. For example, a word document may have looser TRC cycle-up criteria than a photograph. Thus, the system will recognize the type of print request made and adjust the TRC cycle-up criteria based on the type of print job requested. In still further embodiments, a user may establish his or her own initial TRC cycle-up criteria as default settings for all print jobs for that user or all users. Also, before a print job is requested, a user may obtain the current estimated noise levels and the current TRC-cycle-up criteria, and thus adjust the TRC-cycle-up criteria based on factors, such as, CUC time and quality of print desired.

As mentioned above, at step 210, controller 28 calculates the difference value (ΔD, commonly referred to as the control error) to determine whether it falls within the adjusted TRC cycle-up criteria. In embodiments, if it is found that the calculated difference falls within the initial TRC cycle-up criteria, at step 212, convergence is declared and printing may commence. However, if the calculated difference outside of the adjusted TRC cycle-up criteria, convergence is not declared and a current estimated noise level is again obtained and the process is repeated.

The amount the TRC cycle-up criteria is to be adjusted is a balance between minimal CUC wait time and toner stability. For example, in the example above, in order to improve the CUC time, the initial TRC cycle-up criteria may be loosened to +/−2. Thus, the difference value (ΔD) between the adjusted TRC cycle-up criteria and the difference would be "0," and printing will commence at step 212. However, to maintain a higher quality print while also improving CUC time, the initial TRC cycle-up criteria may be adjusted to +/−1.5. Thus, after the TRC cycle-up criteria are adjusted, and the signal falls within the adjusted TRC cycle-up criteria, printing will commence at step 212.

As mentioned above, adjusting the TRC cycle-up criteria is a balance between minimal CUC wait time and image quality performance. Therefore, many factors are taken into consideration when determining the adjustment of TRC cycle-up criteria. For example, the tighter the TRC cycle-up criteria, the longer the CUC wait time, but there is greater confidence that the TRC is on or near target. In contrast, the more loose the TRC cycle-up criteria, the shorter the TRC wait time, but the potential for TRC tracking errors increases. It is the noise level that determines the ability to distinguish among these cases. Further, if the CUC wait time is long, not only will customers become annoyed, but longer wait times also affect component and material life of the printing device. However, TRC cycle-up criteria that are too loose may allow the initiation of a print job prior to TRC convergence, which can result in color transients at the start of a print.

Because measurements are used to adjust the TRC cycle-up criteria, the TRC cycle-up criteria can be scaled as function of the noise level estimates, that is, with respect to the variance in the closed loop steady state reads. For example, if the noise level estimates are high, then loosening the TRC cycle-up criteria may be a good strategy to keep the CUC time low while maintaining toner concentration at levels the process is capable of maintaining throughout the print job. However, if the noise level estimates are small, then lowering, that is, tightening, the TRC cycle-up criteria may be a good strategy for improving image quality control at levels that the process is capable of maintaining throughout a print job, without increasing CUC time substantially.

Table 1 (below) illustrates the decision making process of controller 28 when declaring whether convergence is and is not appropriate. For example, when the TRC mean is truly on target or "close enough" to the target (meaning that the TRC mean is within the initial TRC cycle-up criteria), declaring convergence is appropriate. If convergence is not declared when the TRC mean is truly on target or "close enough." to target, it may not adversely impact toner concentration stability, but it may negatively impact component and material life and may lengthen the CUC time. However, if it is found that the TRC mean is truly off target or too "far away" from the target (meaning that the TRC mean is outside of the initial TRC cycle-up criteria), the appropriate decision is not to declare convergence. If convergence is declared when the TRC mean is truly off target or too "far away" from the target, the CUC time may be minimized, but the stability may be negatively impacted.

TABLE 1

| | TRC truly on target (or "close enough" to target). | TRC truly off target (or too "far" from target). |
|---|---|---|
| Declare Convergence | Correct Decision | May begin printing prior to TRC convergence resulting in poor initial color accuracy, but acts in the desirable direction with respect to minimizing CUC time. |
| Declare Not Converged | Results in longer CUC time than necessary, reducing component life and increasing customer wait time. | Correct Decision |

Detecting the TRC mean to being "off target" is a function of how far off target. There is a direct analogy here with inherent economic trade offs embodied by the management of alpha (α) risk and characteristic curves that determine beta (β) risk for various sample sizes. In the presence of noise, no algorithm will always be correct. However, by characterizing the noise, the economic trade off can be managed.

Therefore, when it is found that convergence is appropriate, the system will proceed with a cycle-up that will provide an appropriate cycle-up time as well as a quality print.

While, as above, determining the values for the TRC cycle-up criteria in deciding how close to target is "close enough" (declare convergence) and how far is too "far" (declare not converged) may be solely dependent upon the noise level estimates, other factors mast also be considered. For example, automatically adjusting the TRC cycle-up criteria based only on the current estimated noise levels may not be the most advantageous for every situation. For example, if the last print job contained heavy toner application involving multiple colors with great detail, for example a photograph, the current estimated noise levels related to loner concentrations and color are now associated with this type of print and therefore may now be quite high. If the next print job requires the same detail, the current estimated noise levels may be representative and appropriate. However, the current estimated noise levels may not be representative if the next print job is a word document that contains a few images with little detail. Thus, automatically adjusting the TRC cycle-up criteria based only on the noise level estimates may not be the most efficient method in this case. Therefore, the system may obtain knowledge of the type of print jobs that have recently been initiated and adjust the TRC cycle-up criteria based on this knowledge as well as the knowledge of the noise level estimates.

Further, the TRC cycle-up criteria may be automatically adjusted to maintain a certain average of CUC time no matter what noise level estimates are determined. That is, if the noise level estimate is high, the system automatically loosens the TRC cycle-up criteria in order to maintain the desired average CUC time. In contrast, if the noise level estimate is low, the system automatically tightens the TRC cycle-up criteria to improve the quality of print while still maintaining the desired average CUC time.

Figure 3:
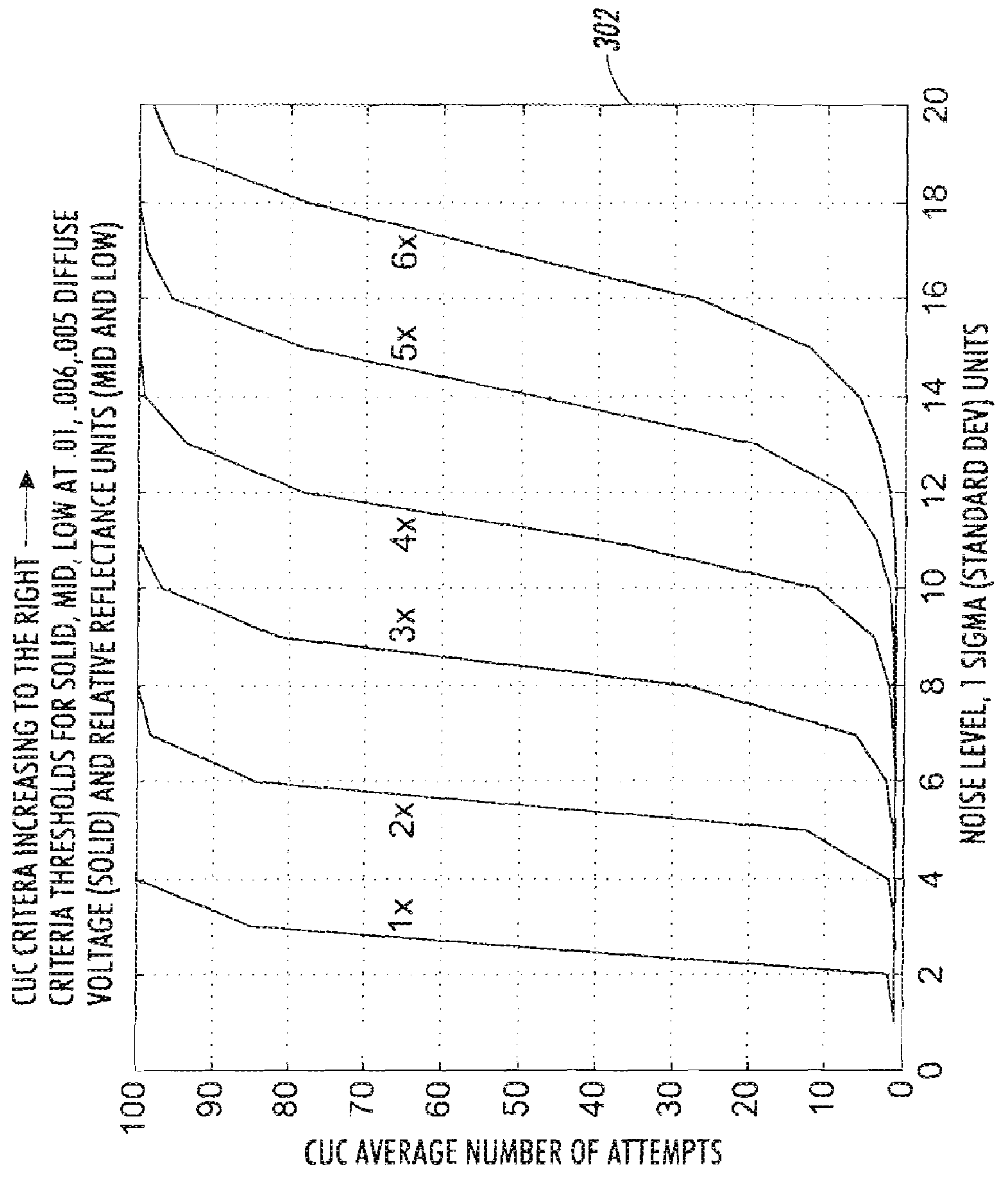
FIG. 3 is an illustrative example of maintaining an average cycle-convergence time in accordance with the present disclosure.

With reference to FIG. 3, a more detailed example of maintaining an average CUC time for all print jobs is shown. For example, to maintain a CUC time average of 20 attempts in a system utilizing a closed loop feedback, the CUC cycle-up criteria is adjusted in relation to the standard deviation of the noise level. The slope of the curves indicate the extent to which the system is robust against variations in the current estimated noise levels, that is, the steeper the curve, the greater CUC variability in the event of a change in the current estimated noise levels. Looking at line 302 that represents an average of 20 CUC attempts, a function of the cycle-up criteria in units, for example, 0.01 diffuse, 0.006 and 0.005 relative reflectance vs. the noise level estimate is obtained. It is this relationship that can be used to calculate the TRC cycle-up criteria as a function of noise level estimates in an actual implementation.

In further embodiments, a user can interact with the TRC cycle-up criteria to balance CUC time vs. quality of a print based on the user's preference. For example, using user interface 34, the user may select to print a photograph. One of ordinary skill in the art will appreciate that the selection of a type of print job may be executed in a variety of ways, for example, selecting the type of print from a drop down menu or a radio button or option button to identify the type of print. Once the user selects the type of print desired, the system automatically adjusts the TRC cycle-up criteria. Because a photograph is desired, the system may tend toward better quality and thus extend the CUC time. However, if a user selects to print a word document, the system automatically adjusts the TRC cycle-up criteria to lessen the CUC time. In further embodiment, the system automatically determines the type of print desired without the selection from a user and adjusts the TRC cycle-up criteria accordingly.

It will be appreciated that various of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method of adjusting a range of cycle-up criteria of a printing device based on estimated noise levels and printing an image, comprising:

obtaining a current estimated noise level of the printing device;

adjusting a range of the cycle-up criteria according to the estimated noise level and according to a type of a print job for the image to be printed;

determining a signal value for at least one signal, from which the noise level is estimated, and comparing the signal value with at least one target value;

calculating a difference value between the signal value and the at least one target value;

comparing the calculated difference value with the range of the adjusted cycle-up criteria; and initiating a print job if the calculated difference value falls within the range of the adjusted cycle-up criteria.

2. The method of claim 1, wherein adjusting the range of the cycle-up criteria according to the current estimated noise level is automatically executed by the printing device.

3. The method of claim 2, wherein adjusting the range of the cycle-up criteria according to the estimated noise level comprises:

increasing the range of the cycle-up criteria if the current estimated noise level has increased; and decreasing the range of the cycle-up criteria if the current estimated noise level has decreased.

4. The method of claim 1, wherein adjusting the range of the cycle-up criteria according to the current estimated noise level is determined by a user.

5. The method of claim 1, wherein the printing device is a xerographic marking device.

6. The method of claim 5, wherein the current estimated noise level is obtained from a signal sampled by a sensor and operating in a feedback loop.

7. The method of claim 5, wherein if the calculated difference value does not fall within the adjusted range of the cycle-up criteria, convergence is not declared and the method is repeated.

8. A system for adjusting a tone reproduction curve (TRC) range of cycle-up criteria of a xerographic marking device, comprising:

a photoreceptor;

an optical sensor;

a user interface; and a controller;

wherein the controller:

compares a current sensor read value with at least one target value of the range of the cycle-up criteria, wherein the range of the cycle-up criteria is based upon an estimated noise level of the device and a type of a print job for the image to be printed;

calculates a difference value between the sensor read value and the at least one target value; and compares the calculated difference value to the range of the cycle-up criteria that has been adjusted according to current estimated noise level.

9. The system of claim 8, wherein the optical sensor is an extended toner area coverage sensor.

10. The system of claim 8, wherein the current estimated noise level is obtained from an operating feedback loop.

11. The system of claim 8, wherein automatically adjusting the TRC range of cycle-up criteria according current estimated noise level, comprises:

increasing the TRC range of cycle-up criteria if the estimated noise level has increased; and decreasing the TRC range of cycle-up criteria if the estimated noise level has decreased.

12. The system of claim 8, wherein a user determines the TRC range of cycle-up criteria.

13. The system of claim 8, wherein the system is a closed loop feedback system.

14. A method of twilling an image on a xerographic marking device, comprising:

a) obtaining a current estimated noise level of the device;

b) adjusting a range of cycle-up criteria according to the current estimated noise level and according to a type of a print job for the image to be printed;

c) determining a signal value for at least one signal from which the current noise level is estimated, and comparing the signal value with at least one target value;

d) calculating a difference value between the signal value and the at least one target value;

e) comparing the calculated difference value with the range of the cycle-up criteria;

wherein if the calculated difference value falls within the range of the adjusted cycle-up criteria, convergence is declared and printing is initiated, and if the calculated difference value does not fall within the range of the adjusted cycle-up criteria, steps a)-e) are repeated.

15. The method of claim 14, wherein the current estimated noise level is obtained from a feedback loop.

16. The method of claim 14, wherein adjusting the range of the cycle-up criteria according the current estimated noise level is automatically executed by the xerographic marking device.

17. The method of claim 14, wherein adjusting the range of the cycle-up criteria according to current estimated noise level, comprises:

loosening the range of the cycle-up criteria if the current estimated noise level has increased; and tightening the range of the cycle-up criteria if the current estimated noise level has decreased.

18. The method of claim 14, wherein adjusting the range of the cycle-up criteria according to the current estimated noise level is determined by a user.

19. The method of claim 14, wherein adjusting the range of the cycle-up criteria according to the current estimated noise level further comprises:

obtaining information on the type of print job that has recently been initiated, and further adjusting the range of the cycle-up criteria according to the information.

20. The method of claim 14, wherein the range of the cycle-up criteria is tone reproduction curve (TRC) range of cycle-up criteria.

* * * * *